(12) United States Patent
Nakanishi

(10) Patent No.: US 7,450,322 B2
(45) Date of Patent: Nov. 11, 2008

(54) LENS DEVICE AND IMAGING APPARATUS

(75) Inventor: Hitoshi Nakanishi, Kanangawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/907,202

(22) Filed: Oct. 10, 2007

(65) Prior Publication Data

US 2008/0088951 A1  Apr. 17, 2008

(30) Foreign Application Priority Data

Oct. 16, 2006  (JP) .............................. 2006-281044

(51) Int. Cl.
 *G02B 13/18* (2006.01)
 *G02B 9/14* (2006.01)
(52) U.S. Cl. ...................... 359/716; 359/785
(58) Field of Classification Search ................ 359/715, 359/716, 785
See application file for complete search history.

(56) References Cited

U.S. PATENT DOCUMENTS 7,167,323 B2 *  1/2007  Isono ..................... 359/791
7,262,925 B2 *  8/2007  Huang .................... 359/796
2007/0242369 A1 * 10/2007  Huang et al. .............. 359/716

FOREIGN PATENT DOCUMENTS

| JP | 2001-272598 |   | 10/2001 |
| JP | 2004-302058 | A | 10/2004 |
| JP | 2005-258181 |   | 9/2005 |
| JP | 2005-309210 |   | 11/2005 |
| JP | 2007-316375 | A | 12/2007 |

OTHER PUBLICATIONS

JPO Office Action, App. No. 2006-281004, May 16, 2008 (2 pages).

* cited by examiner

*Primary Examiner*—Scott J Sugarman
(74) *Attorney, Agent, or Firm*—Rader Fishman & Grauer PLLC; Ronald P. Kananen

(57) ABSTRACT

An image capture lens includes, in order and from a side of an object, a first positive lens having a convex surface facing the object, an aperture diaphragm, a second negative lens having a convex surface facing an image, a third positive lens having a concave surface facing the image, and an IR cut filter. The three lenses, aperture diaphragm, and IR cut filter are formed of resin materials, all the lens surfaces except for the IR cut filter are aspheric, and Conditional Equations (A0) to (A2) are satisfied. (A0) $0.3<f/f1<1.5$, (A1) $-9<f/|f2|\times 100 <-0.9$, and (A2) $0.3<D2/D3<0.5$, where f: focal distance of the whole system, f1: focal distance of the first lens, f2: focal distance of the second lens, D2: distance from the first lens to aperture diaphragm, and D3: distance from aperture diaphragm to the second lens.

4 Claims, 7 Drawing Sheets

LENS DEVICE AND IMAGING APPARATUS

BACKGROUND OF THE INVENTION

1. Field of the Invention

The present invention relates to image capture lenses and an image capture apparatus. More specifically, the present invention relates to a digital input apparatus (digital still camera, digital video camera, and the like) which takes in an image of a subject by means of a solid imaging device, and particularly to small-size image capture lenses suitable for a camera unit of a small-size electronic information apparatus, such as a mobile phone, PDA (Personal Digital Assistant, and the like) and an image capture apparatus using the image capture lenses.

2. Description of Related Art

In recent years, with wide-spreading of personal computers and the like, a digital still camera, a digital video camera, a camera module for mobile phones, and the like. (hereafter simply referred to as "digital camera") which can take image information into a digital device easily, have been spreading to individual users. It is expected that such a digital camera continues to spread increasingly as an input apparatus for image information.

Further, the miniaturization of solid imaging devices, such as CCD (Charge Coupled Device), and, CMOS (Complementary Metal-Oxide Semiconductor), built in the digital camera, is progressing, and accordingly much more miniaturization is also required for the digital camera. For this reason, there is also a strong need for the miniaturization with respect to the image capture lens which occupies the largest volume in the digital input apparatus. Although, to reduce in size the solid imaging device is the easiest way of miniaturizing the image capture lens, it is necessary to reduce in size a light receiving element to this end. Further, the difficulty in manufacturing the solid imaging device increases, and performance required for the image capture lens also becomes high.

On the other hand, if the size of the solid imaging device is left as it is and the image capture lens is reduced in size, an exit pupil position approaches an image plane inevitably. If the exit pupil position approaches the image plane, an off-axis light flux emitted from the image capture lens may be obliquely incident on an image plane, and condensing performance of a micro lens provided in the front of the solid imaging device is not fully demonstrated. Thus, an issue arises in that brightness of the image is considerably different at the image center and the image edges. If the exit pupil position of the image capture lens is remotely located in order to solve this issue, it is no longer possible to avoid increase in size of the image capture lens as a whole.

Furthermore, due to the low-pricing competition in recent years, there is also a large demand for a reduction in cost with respect to the image capture lens.

As for the above demand, an image capture lens of a three-lens design is proposed in patent documents 1-3.

SUMMARY OF THE INVENTION

The image capture lens of a three-lens design as disclosed in Japanese Patent Application Publication No. JP2001-272598 has a full length which is approximately three times a focal distance, and is not compact. Although the image capture lens as disclosed in Japanese Patent Application Publication No. JP2005-309210 is compact, the first lens and an aperture are so close together that formation of the aperture with a resin material may make it difficult to sharpen a tip in shape by way of molding, causing a ghost to generate. Since the image capture lens as disclosed in Japanese Patent Application Publication No. JP2005-258181 has strong power in the second lens, it can be made compact, but a decenter susceptibility during assembly becomes high.

Accordingly, it is desirable to provide an image capture lens for a solid imaging device with good optical property, low cost and a compact structure, and an image capture apparatus using the same. The present invention is made in view of the above issues.

An image capture lens in accordance with an embodiment of the present invention includes, in order and from a side of an object, a first positive lens having a convex surface facing the object, an aperture diaphragm, a second negative lens having a convex surface facing an image, a third positive lens having a concave surface facing the image, and an IR cut filter. The three lenses, aperture diaphragm, and IR cut filter are formed of resin materials. All the lens surfaces except for the IR cut filter are aspheric. Furthermore, Conditional Equations (A0) to (A2)

$$0.3 < f/f1 < 1.5 \quad (A0)$$

$$-9 < f/|f2| \times 100 < -0.9 \quad (A1)$$

$$0.3 < D2/D3 < 0.5, \quad (A2)$$

where f: focal distance of the whole system, f1: focal distance of the first lens, f2: focal distance of the second lens, D2: distance from the first lens to aperture diaphragm, and D3: distance from aperture diaphragm to the second lens are satisfied.

In another embodiment of the present invention, there is provided an image capture apparatus having an image capture lens and an imaging device which converts an optical image formed by the image capture lens into an electric signal. The image capture lens includes, in order and from a side of an object, a first positive lens having a convex surface facing the object, an aperture diaphragm, a second negative lens having a convex surface facing an image, a third positive lens having a concave surface facing the image, and an IR cut filter. The three lenses, aperture diaphragm and IR cut filter are formed of resin materials. All the lens surfaces except for the IR cut filter are aspheric. Furthermore, Conditional Equations (A0) to (A2)

$$0.3 < f/f1 < 1.5 \quad (A0)$$

$$-9 < f/|f2| \times 100 < -0.9 \quad (A1)$$

$$0.3 < D2/D3 < 0.5, \quad (A2)$$

where f: focal distance of the whole system, f1: focal distance of the first lens, f2: focal distance of the second lens, D2: distance from the first lens to aperture diaphragm, and D3: distance from aperture diaphragm to the second lens are satisfied.

According to the present invention, there is provided an image capture lens for a solid imaging device with good optical property, low cost and a compact structure, and an image capture apparatus using the same.

DETAILED DESCRIPTION OF EMBODIMENTS

Figure 1:
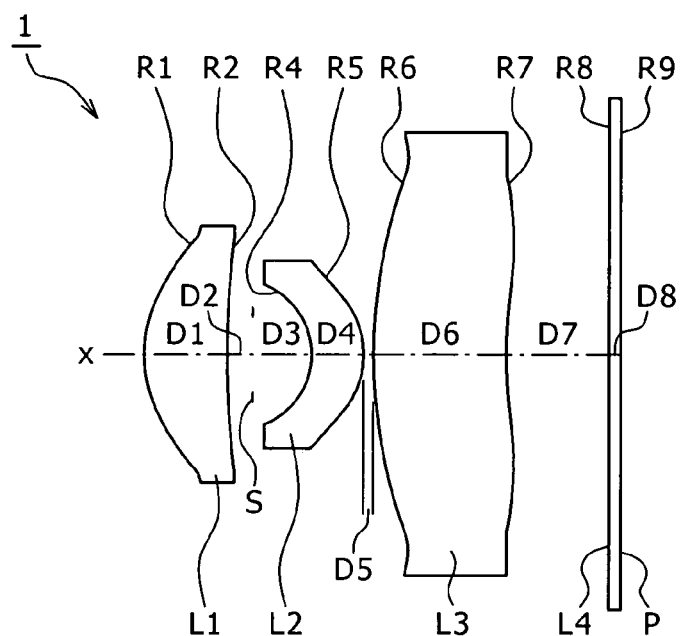
FIG. 1 is a view showing a lens arrangement of a first embodiment of an image capture lens of the present invention.

Hereafter, image capture lenses and image capture apparatuses according to embodiments of the present invention will be described with reference to the drawings.

An image capture lens according to an embodiment of the present invention includes, in order and from a side of an object, a first positive lens having a convex surface facing the object, an aperture diaphragm, a second negative lens having a convex surface facing an image, a third positive lens having a concave surface facing the image, and an IR cut filter. The three lenses, aperture diaphragm, and IR cut filter are formed of resin materials. All the lens surfaces except for the IR cut filter are aspheric. Furthermore, Conditional Equations (A0) to (A2)

$$0.3 < f/f1 < 1.5 \tag{A0}$$

$$-9 < f/|f2| \times 100 < -0.9 \tag{A1}$$

$$0.3 < D2/D3 < 0.5, \tag{A2}$$

where
- f: focal distance of the whole system,
- f1: focal distance of the first lens,
- f2: focal distance of the second lens,
- D2: distance from the first lens to aperture diaphragm, and
- D3: distance from aperture diaphragm to the second lens are satisfied.

The image capture lens of the present embodiment is configured to have power distribution of positive-negative-positive in order and from the side of the object, to be provided with the aperture diaphragm between the first lens and the second lens, thereby being suitable for obtaining good optical property for a single focal lens of the three-lens structure. Such an arrangement allows to take a longer distance from an imaging position to an exit pupil. This means that an angle between an optical axis and main light of each light flux emitted from the last side of a lens system is reduced, preventing an incidence angle onto the solid imaging device from becoming steep. Accordingly, good optical property may be obtained.

Furthermore, although the image capture lens of the present embodiment has an inexpensive and simple lens arrangement that includes as few as three lenses, its aberration is good and sufficiently corrected and attains higher performance by using an aspheric surface lens and appropriately setting up power distribution.

Conditional Equation (A0) specifies a positive refractive index of the first lens. Having a value less than the upper limit value of Conditional Equation (A0), it is possible to reduce a total optical length of the image capture lens while maintaining the positive refractive index required for the first lens. On the other hand, having a value greater than the lower limit prevents the refractive index of the first lens from being too large, enabling control of a high order coma aberration to be small and allowing easy compensation of the a spherical aberration.

Conditional Equation (A1) specifies a negative refractive index of the second lens. Having a value greater than the lower limit of Conditional Equation (A1), it is possible to secure the required effective diameter and control manufacturing errors. On the other hand, having a value less than the upper limit value, it is possible to maintain the negative refractive index required for the second lens.

Conditional Equation (A2) secures an effective diameter of the second lens and specifies a position of the aperture diaphragm required in order to secure the optimal mold shape of the aperture diaphragm which is made of a resin material for providing good compensation for stray light. A value less than the upper limit value of Conditional Equation (A2) allows the incidence angle of the ray onto the imaging device to be small. On the other hand, a value greater than the lower limit of Conditional Equation (A2) allows control of the effective diameter of the second lens to be small, and ensures satisfying molding conditions required for processing the aperture diaphragm, which is made of the resin material, so as to have an acute angle tip shape. At this stage, the shape of the aperture diaphragm is such that the tip section is molded to have slopes from both sides, thus being easy for the resin to flow through at the time of molding, and enabling forming the tip in an acute angle. As the tip of the aperture diaphragm is being formed in an acute angle, it is possible to reduce an area of the tip section, whereby a reflection surface becomes small and it is possible to reduce the stray light generated by reflection. Furthermore, the inclined surface of the aperture diaphragm, which faces the first lens side, has a larger angle with respect to the optical axis than that of the surface facing the second lens side. Accordingly, the stray light reflected by the inclined surface on the entrance plane side of the aperture is unlikely to reach beyond the second lens, leading to still better provisions for the stray light prevention.

In the image capture lens according to the present embodiment, the first lens is arranged on the object side of the aperture diaphragm, and the second lens and the third lens are arranged on the image plane side of the aperture diaphragm. Accordingly, it is necessary to satisfy both the power balance requirements and manufacturing requirements in the object side and the image plane side of the aperture diaphragm made of resin material. If the value exceeds the upper limit values of Conditional Equations (A0)-(A2), it becomes difficult to satisfy conditions for a higher order coma aberration. If it exceeds these upper-limit values, it becomes difficult to satisfy the latter conditions, making it difficult to compensate the field curvature.

The above-described generation of stray light which depends on the shape of the aperture diaphragm will now be described in detail with reference to FIG. 5.

Figure 5:
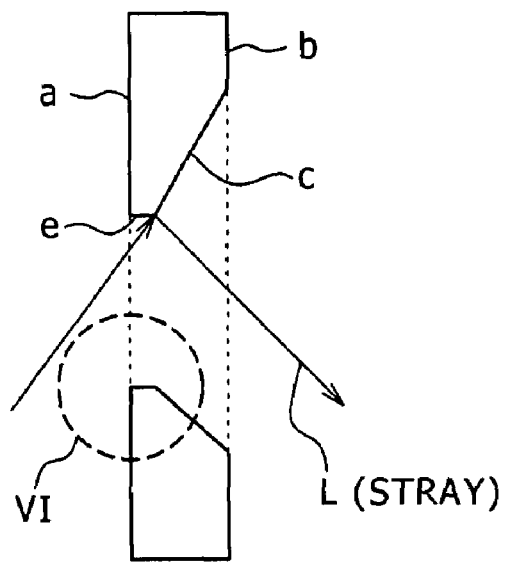
FIG. 5 is a schematic expanded sectional view of an aperture diaphragm for explaining, together with FIG. 6, an issue when a value is less than a lower limit of Conditional Equation (A2)
Figure 6:
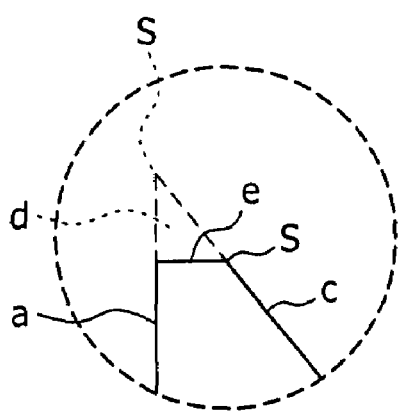
FIG. 6 is an expanded view of a part designated by VI in FIG. 5.

If the aperture diaphragm S is close to the first lens, as shown in FIG. 5, the slope cannot be formed on the object side surface "a" of a member (part of camera casing or lens mirror barrel) in which the aperture diaphragm S is formed. Accordingly, it is necessary to make the object side surface "a" into a plane, form a slope "c" starting from the image side surface "b", thereby forming an edge of the aperture diaphragm S. As for the shape shown in FIG. 5, an angle between a plane "a" and the slope "c" is an acute angle (see broken line portion of FIG. 6). Thus, at the time of injection molding material, a resin material may not reach into a tip portion "d", and the aperture diaphragm S having a desired edge may not be formed, but an unexpected irregular surface "e" may be formed. Further, light L (stray) reflected by such an irregular surface "e" turns into the stray light. Therefore, it is necessary for the value to exceed the lower limit of Conditional Equation (A2).

Figure 7:
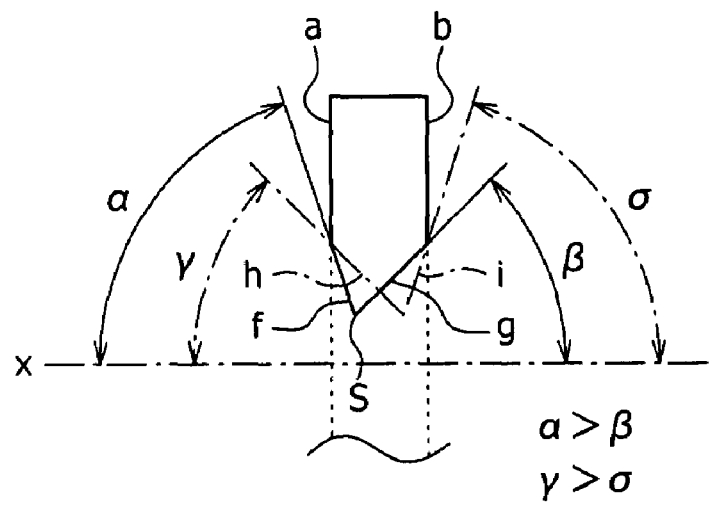
FIG. 7 is a schematic expanded sectional view of a main part of an aperture diaphragm view for explaining, together with FIG. 8, an issue when a value is greater than an upper limit of Conditional Equation (A2)
Figure 8:
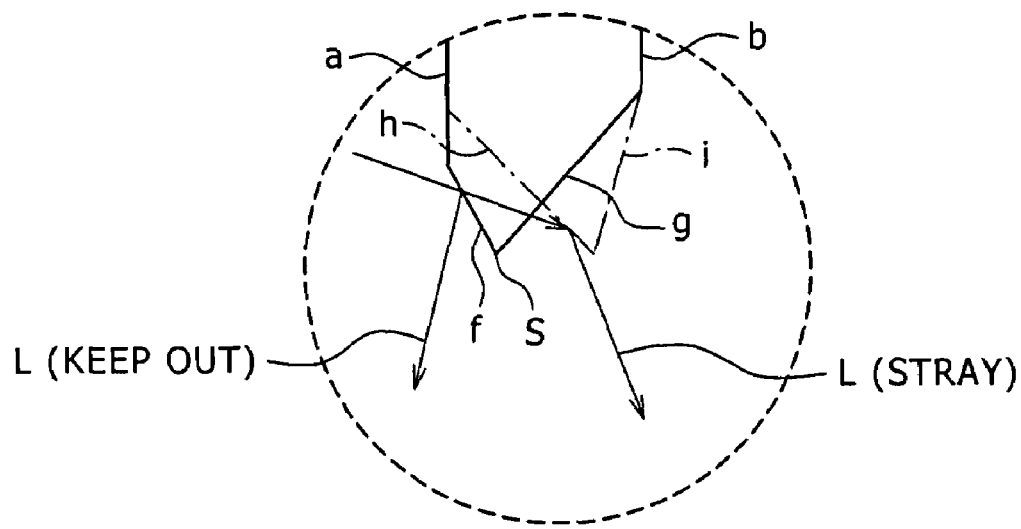
FIG. 8 is a view in which a main part in FIG. 7 is further expanded and shown.

Further, if it is possible to form the slopes from both the object side surface "a" and the image side surface "b" as shown in FIG. 7, formations of the irregular surface due to incomplete flow of the resin material at the time of molding can be prevented. Further, as shown by a solid line in FIG. 7, when an angle α between an optical axis X and the slope "f" on the object side is larger than an angle β between the optical axis X and a slope g on image plane side, light L (kept out) reflected by the slope "f" does not go into the image side beyond the aperture diaphragm S, and does not become obstructive with respect to formation of the optical image (see FIG. 8). However, as shown by a dash-and-dot line in FIG. 7, when an angle γ between the optical axis X and a slope h on the object side is smaller than an angle σ between the optical axis X and a slope i on the image plane side, the light L (stray) reflected by the slope h on the object side is likely to enter the image plane side (second lens side) and to be the stray light. Therefore, it is necessary for the value to be less than the upper limit value of Conditional Equation (A2).

It is desirable that the zoom lens in accordance with an embodiment of the present embodiment satisfies the following Conditional Equations (A3) and (A4).

$$f/D8<35 \quad (A3)$$

$$Nd4>1.6 \quad (A4)$$

where

D8: thickness of the IR cut filter,

Nd4: refractive index at d-ray of the IR cut filter.

Conditional Equation (A3) specifies the thickness of the IR cut filter. If it exceeds the upper limit value of Conditional Equation (A3), the total lens length becomes large.

Conditional Equation (A4) specifies the refractive index of the IR cut filter. If it is less than the lower limit value of Conditional Equation (A4), the thickness has to be increased exceeding the upper limit value of Conditional Equation (A3) in order for the IR cut filter to achieve a predetermined function, leading to a larger total lens length.

It is desirable that the image capture lens in accordance with an embodiment of the present embodiment satisfies the following Conditional Equation (A5) in order to maintain stable performance after manufacturing by lowering susceptibility to decenter or tilt, and to appropriately compensate the field curvature.

$$0.05<f/f3<0.1 \quad (A5)$$

where f3: focal distance of the third lens.

Conditional Equation (A5) specifies the focal distance of the third lens group. The value less than the upper limit value of Conditional Equation (A5) allows reduction of the susceptibility to the image plane performance due to optical decenter and/or tilt in the manufacturing, enabling a reduction in the field curvature. On the other hand, because of the value exceeding the lower limit, it becomes possible to maintain the positive refractive index required for the third lens. Next, specific embodiments of the image capture lens of the present embodiment and numerical examples to which particular numerical values are applied in the specific embodiment will be described with reference to the drawing and tables.

It should be noted that aspheric surfaces are employed in each embodiment, and each aspheric surface shape is defined by Equation 1 below.

$$Z = \frac{(C)Y^2}{1+\sqrt{1-(1+K)(C)^2 Y^2}} + (A4)Y^4 + (A6)Y^6 + (A8)Y^8 + \ldots (An)Y^n \quad \text{[Equation 1]}$$

It should be noted that, in Equation 1, C is curvature, K is cone constant, Y is height from optical axis, and An is n-th aspheric surface coefficient.

FIG. 1 is a view showing a lens arrangement of a first embodiment of the image capture lens of the present invention. An image capture lens 1 includes, in order and from the side of an object, a first lens L1 formed of a meniscus lens having a positive refractive power in which its convex surface faces towards the object, an aperture diaphragm S made of a resin material, a second lens L2 formed of a negative lens in which its concave surface faces towards an image, a third lens L3 formed of a positive lens in which its convex surface faces towards the image, and an IR cut filter L4 made of a resin material. All the lens surfaces except for the IR cut filter are of an aspheric type. It should be noted that in FIG. 1, a reference sign P indicates a position of an image capture surface.

An upper part in the following Table I shows a focal distance f of the image capture lens, an F-number Fno., and 2ω of an angle of field in accordance with Numerical Example 1 which applies the particular values to the image capture lens 1 in accordance with the first embodiment. Further, a middle part in Table 1 shows a curvature radius R of each lens surface, a center thickness of each lens and an air gap D between the respective lenses (hereafter these are generally referred to as axial surface gap), and a refractive index Nd and a value of Abbe number vd at d-line of each lens. It should be noted that numeral "i" of a surface number (Si at middle part in Table 1, i at lower part in Table 1) represents an order from the object side. Further, the lower part in Table 1 shows the cone constant k of the aspheric surface shown in the aspheric surface equation and a value of each of aspheric surface coefficients A4, A6, and A8, . . . , An. It should be noted that at the lower part in Table 1 and in tables showing the following aspheric surface coefficients, "E-i" expresses an exponential notation which uses 10 as a base, i.e., "$10^{-i}$", for example, "0.12345E-05" expresses "$0.12345\times10^{-5}$".

TABLE 1 f = 3.87 Fno 3.25 2ω = 61.6

| | R | D | Nd | ν d |
|---|---|---|---|---|
| R1 | 1.58621 | 0.897742 | 1.5299 | 55.8 |
| R2 | 6.66511 | 0.27257 | | |
| S | | 0.635524 | | |
| R3 | −0.78213 | 0.568 | 1.5855 | 29.9 |
| R4 | −0.99614 | 0.1 | | |
| R5 | 3.34402 | 1.438471 | 1.5299 | 55.8 |
| R6 | 3.34502 | 1.1 | | |
| R7 | | 0.1 | 1.608 | — |
| R8 | | 0 | | |

| | | | | | | | | | | |
|---|---|---|---|---|---|---|---|---|---|---|
| 1 | k | −0.886199 | A4 | :0.261243E−01 | A6 | :0.303554E−02 | A8 | :0.194530E−02 | A10 | :−.574356E−02 |
| 2 | k | 14.607507 | A4 | :−.213016E−01 | A6 | :−.537960E−01 | A8 | :0.410650E−01 | A10 | :−.729108E−02 |
| 3 | k | −0.784288 | A4 | :−.621146E−01 | A6 | :−.377560E+00 | A8 | :0.798850E+00 | A10 | :−.758537E+00 |
| 4 | k | −0.250611 | A4 | :0.227852E−01 | A6 | :0.278360E−02 | A8 | :0.156458E+00 | A10 | :−.974599E−01 |
| | | | A12 | :0.173642E+00 | A14 | :−.322779E+00 | A16 | :0.339571E+00 | A18 | :−.121743E+00 |
| 5 | k | −31.939612 | A4 | :−.773603E−02 | A6 | :0.123367E−01 | A8 | :−.308404E−02 | A10 | :0.206138E−03 |
| 6 | k | −28.782734 | A4 | :−.174877E−01 | A6 | :−.881789E−02 | A8 | :0.403839E−02 | A10 | :−.455663E−03 |

Figure 2:
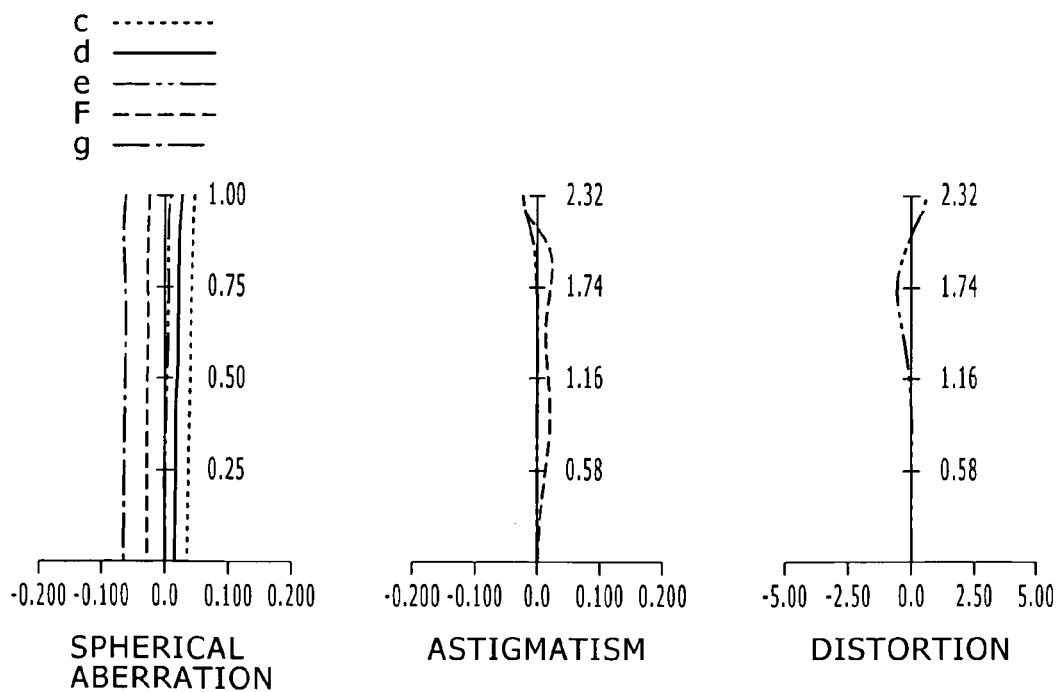
FIG. 2 is a graph showing a spherical aberration, astigmatism, and distortion in Numerical Example 1 in which certain values are applied to the first embodiment.

FIG. 2 is an aberration graph showing several aberrations (spherical aberration, astigmatism, and distortion) in the Numerical Example 1. It should be noted that, in the spherical aberration graph, spherical aberrations are respectively shown by a solid line for the d-line, by a dotted line for the C-line, by a dash-dot line for the g-line, by a broken line for the F-line, and by a dash-double-dot line for the e-line. In the astigmatism graph, aberrations are respectively shown by a solid line for a sagittal image plane, and by a broken line for a tangential image plane. As is clear from these aberration graphs, it can be seen that the image capture lens in accordance with the Numerical Example 1 has an outstanding optical performance by which each aberration is compensated well.

Figure 3:
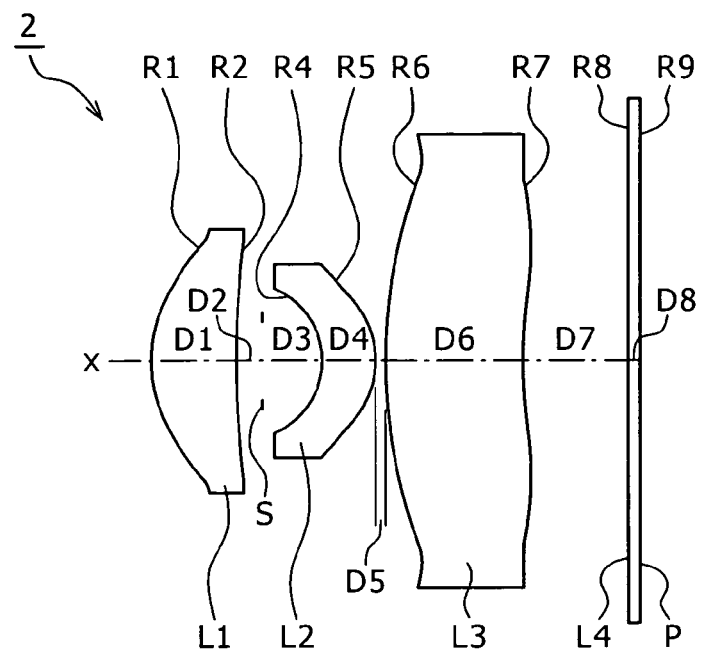
FIG. 3 is a view showing a lens arrangement of a second embodiment of the image capture lens of the present invention.

FIG. 3 is a view showing a lens arrangement of a second embodiment of the image capture lens in accordance with the present invention. An image capture lens 2 includes, in order and from the side of an object, a first lens L1 formed of a meniscus lens having a positive refractive power in which its convex surface faces towards the object, an aperture diaphragm S made of a resin material, a second lens L2 formed of a negative lens in which its concave surface faces towards the object, a third lens L3 formed of a positive lens in which its convex surface faces towards the object, and an IR cut filter L4 made of a resin material. All the lens surfaces except for the IR cut filter are of an aspheric type. It should be noted that in FIG. 3, reference sign P indicates a position of an image capture surface.

An upper part in the following Table 2 shows a focal distance f of the image capture lens, an F-number Fno., and 2ω of an angle of field in accordance with Numerical Example 2 in which the particular values are applied to the image capture lens 2 in accordance with the second embodiment. Further, a middle part in Table 2 shows a curvature radius R of each lens surface, a center thickness of each lens and an air gap D between the respective lenses (hereafter these are generally referred to as an axial surface gap), and a refractive index Nd and the value of Abbe number vd at d-line of each lens. It should be noted that numeral "i" of a surface number (Si at middle part in Table 2, i at lower part in Table 2) represents an order from the object side. Further, the lower part in Table 2 shows the cone constant k of the aspheric surface shown in the aspheric surface equation and a value of each of aspheric surface coefficients A4, A6, and A8, . . . , An.

TABLE 2 f = 3.87 Fno 3.25 2ω = 62.05

| | R | D | Nd | ν d |
|---|---|---|---|---|
| R1 | 1.57733 | 0.893292 | 1.5299 | 55.8 |
| R2 | 6.88673 | 0.269217 | | |
| S | | 0.638048 | | |
| R3 | −0.77903 | 0.568 | 1.5855 | 29.9 |
| R4 | −0.99983 | 0.1 | | |
| R5 | 3.42796 | 1.469845 | 1.5299 | 55.8 |
| R6 | 3.42892 | 1.1 | | |
| R7 | | 0.05 | 1.611 | — |
| R8 | | 0 | | |

| | | | | | | | | | | |
|---|---|---|---|---|---|---|---|---|---|---|
| 1 | k | −0.886199 | A4 | :0.256015E−01 | A6 | :0.165515E−02 | A8 | :0.142778E−02 | A10 | :−.620454E−02 |
| 2 | k | 14.607507 | A4 | :−.242992E−01 | A6 | :−.639736E−01 | A8 | :0.519126E−01 | A10 | :−.724925E−02 |
| 3 | k | −0.784268 | A4 | :−.675092E−01 | A6 | :−.377453E+00 | A8 | :0.722294E+00 | A10 | :−.708375E+00 |
| 4 | k | −0.250611 | A4 | :0.248147E−01 | A6 | :0.681435E−02 | A8 | :0.143349E+00 | A10 | :−.119526E+00 |
| | | | A12 | :0.210516E+00 | A14 | :−.258092E+00 | A16 | :0.195671E+00 | A18 | :−.557995E−01 |
| 5 | k | −31.939612 | A4 | :−.733879E−02 | A6 | :0.124161E−01 | A8 | :−.307992E−02 | A10 | :0.192973E−03 |
| 6 | k | −28.782734 | A4 | :−.173930E−01 | A6 | :−.881156E−02 | A8 | :0.404565E−02 | A10 | :−.454847E−03 |

Figure 4:
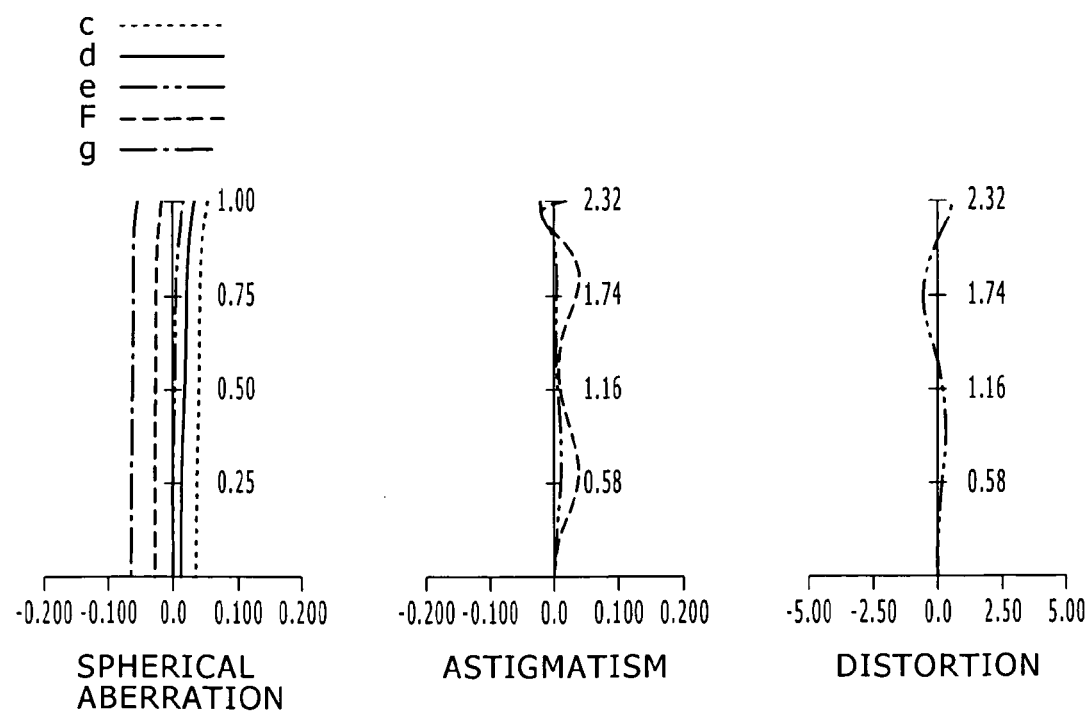
FIG. 4 is a graph showing a spherical aberration, astigmatism, and distortion in Numerical Example 2 in which certain values are applied to the second embodiment.

FIG. 4 is an aberration graph showing several aberrations (spherical aberration, astigmatism, and distortion) in Numerical Example 2. It should be noted that, in the spherical aberration graph, spherical aberrations are respectively shown by a solid line for the d-line, by a dotted line for the C-line, by a dash-dot line for the g-line, by a broken line for the F-line, and by a dash-double-dot line for the e-line. In the astigmatism graph, aberrations are respectively shown by a solid line for a sagittal image plane, and by a broken line for a tangential image plane. As is clear from these aberration graphs, it can be seen that the image capture lens in accordance with Numerical Example 2 has an outstanding optical performance by which each aberration is compensated well.

With respect to Conditional Equations (A0) to (A5), the following Table 3 shows corresponding values of the image capture lens in accordance with the Numerical Example 1 and the Numerical Example 2.

TABLE 3

|    | EXAMPLE 1 | EXAMPLE 2 |
|----|-----------|-----------|
| A0 | 1.05      | 1.07      |
| A1 | −0.95     | −2.94     |
| A2 | 0.43      | 0.42      |
| A3 | 38.70     | 3.99      |
| A4 | 1.61      | 1.53      |
| A4 | 1.61      | 1.53      |
| A5 | 0.09      | 0.09      |

As shown in Table 3, both the image capture lenses in accordance with Numerical Example 1 and Numerical Example 2 satisfy Conditional Equations (A0) to (A5). Further, as shown in each of the aberration graphs, good optical performances are provided where every aberration is compensated well.

Next, an image capture apparatus according to another embodiment of the present invention will be described.

An image capture apparatus in accordance with the present embodiment includes an image capture lens and an imaging device which converts an optical image formed by the image capture lens into an electric signal. The image capture lens includes, in order and from the side of an object, a first positive lens whose convex surface faces towards the object, an aperture diaphragm, a second negative lens whose convex surface faces towards the image, a third positive lens whose concave surface faces towards the image, and an IR cut filter. The three lenses, the aperture diaphragm, and the IR cut filter are formed of a resin material, and all the lens surfaces except for the IR cut filter are of an aspheric type, and Conditional Equations (A0) to (A2) below are satisfied.

$$0.3 < f/f1 < 1.5 \quad (A0)$$

$$-9 < f/|f2| \times 100 < -0.9 \quad (A1)$$

$$0.3 < D2/D3 < 0.5, \quad (A2)$$

where f: focal distance of the whole system, f1: focal distance of the first lens, f2: focal distance of the second lens, D2: distance from the first lens to the aperture diaphragm, and D3: distance from the aperture diaphragm to the second lens.

Figure 9:
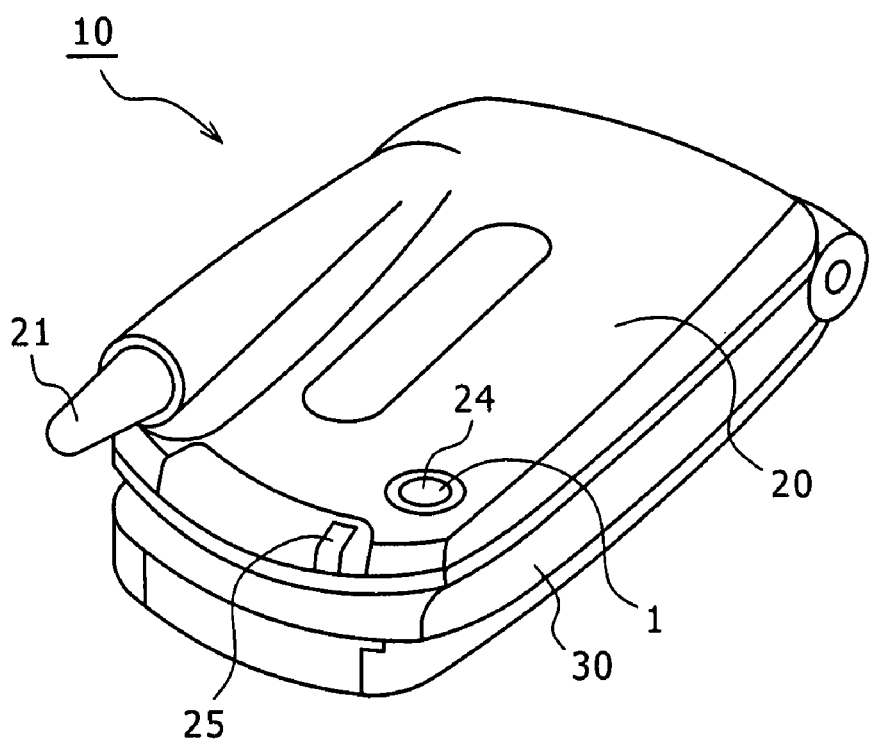
FIG. 9 is a perspective view showing, together with FIGS. 10 and 11, a non-operation mode or a standby mode of an embodiment in which an image capture apparatus according to an embodiment of the present invention is employed as a camera unit of a mobile phone.
Figure 10:
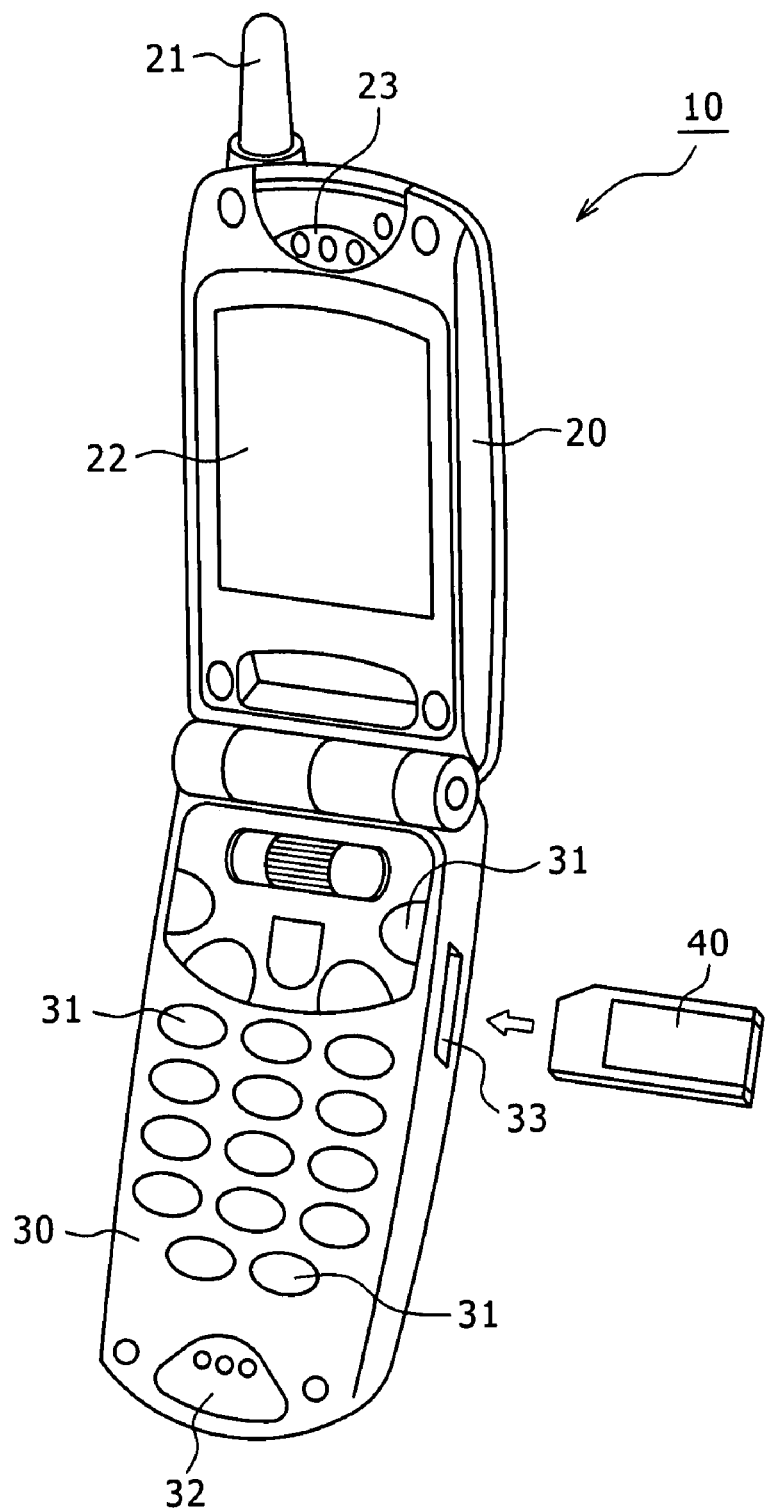
FIG. 10 is a perspective view showing an operation mode.
Figure 11:
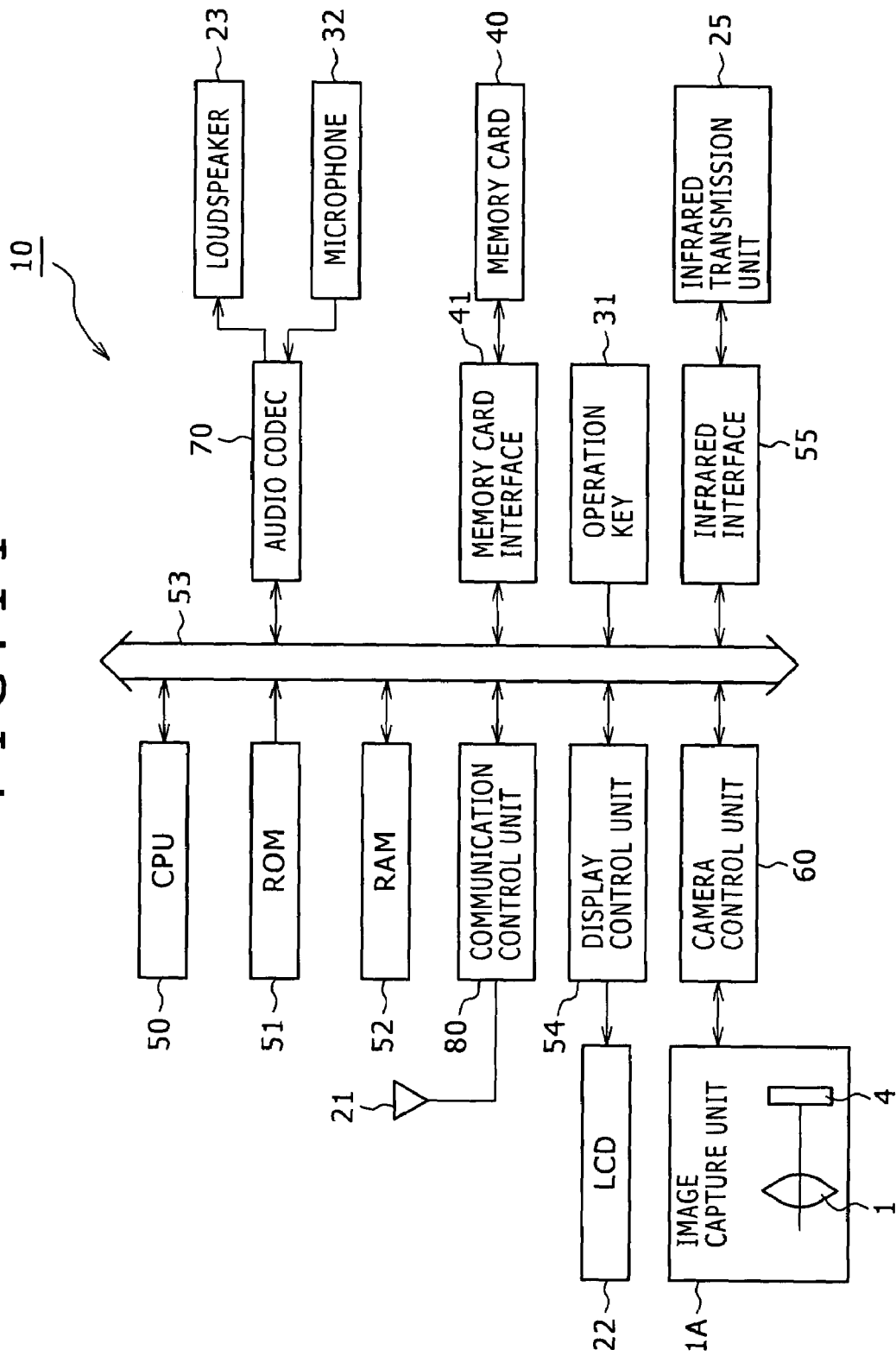
FIG. 11 is a block diagram showing an internal structure in an embodiment of the present invention.

FIGS. 9 to 11 show an embodiment in which the image capture apparatus of the present invention is applied to a camera unit of a mobile phone.

FIGS. 9 and 10 show appearances of a mobile phone 10.

The mobile phone 10 is arranged such that a display unit 20 and a body 30 are connected together while being foldable at a central hinge unit. It is folded up as shown in FIG. 9 at the time of carrying, and is changed into another position where the display unit 20 and the body 30 are opened as shown in FIG. 10 when in use, such as at the time of a telephone call and so forth.

An antenna 21 for transmitting/receiving an electric wave to/from a base station is extendable and provided in a position closer to one side in the back of a display unit 20. Further, a liquid crystal display panel 22 is provided at an internal surface of the display unit 20, and is of a size occupying substantially the whole internal surface area. A loudspeaker 23 is arranged above this liquid crystal display panel 22. Furthermore, the display unit 20 is provided with an image capture unit 1A of a digital camera unit. An image capture lens I (or image capture lens 2) of the image capture unit 1A faces outwards through a view hole 24 formed in the back of the display unit 20. It should be noted that the term of "image capture unit" is used here as one that includes the image capture lens I and an imaging device 4. In other words, although it is necessary for the image capture lens I and the imaging device 4 to be provided together in the display unit 20, the concept of "image capture unit" is used to clarify that other parts which constitute the digital camera unit, for example, a camera control unit, a recording medium, etc., may be provided at the body 30. It should be noted that as the imaging device 4, one that uses photoelectric conversion elements, such as for example CCD and CMOS, may be used. Further, as the image capture lens 1 or 2, the above-mentioned image capture lens 1 or 2 of the embodiments described above may be used. Alternatively, an image capture lens according to still another embodiment other than the embodiments described the above may also be used.

Furthermore, an infrared communications unit 25 is disposed at a tip portion of the display unit 20. The infrared communications unit 25 is provided with an infrared light emitting element and an infrared light receiving element (not shown in the figure).

Operation keys 31, 31, . . . , such as numeral keys "0" through "9", a calling key, a power key, and so forth, are provided in the internal surface of the body 30, and a microphone 32 is arranged under a part in which the operation keys 31, 31, . . . are arranged. Further, a memory card slot 33 is formed at a side of the body 30, so that a memory card 40 can be inserted into or detached from the body 30 through the memory card slot 33.

FIG. 11 is a block diagram showing a structure of the mobile phone 10.

The mobile phone 10 is provided with a CPU (Central Processing Unit) 50, and the CPU 50 controls operation of the whole mobile phone 10. That is, the CPU 50 loads a control program stored in ROM (Read Only Memory) 51 to RAM 52 (Random Access Memory), and controls operation of the mobile phone 10 through a bus 53.

A camera control unit 60 controls the image capture unit 1A which is formed of the image capture lens 1 and the imaging device 4 to capture photos images, such as a still image and a moving image. The obtained image information is subjected to a compression process, such as the JPEG, the MPEG, and so forth, then provided for the bus 53. The image information provided for the bus 53 is temporarily stored in RAM 52, is outputted to a memory card interface 41 if needed, and it is stored with the memory card interface 41 in the memory card 40, or it is displayed on the liquid crystal display panel 22 through a display control unit 54. Further, audio information recorded through the microphone 32 at the same time as the images are captured is temporarily stored together with the image information in RAM 52 through an audio codec 70. The audio information is also stored in the memory card 40, and it is outputted from a loudspeaker 23 through the audio codec 70 together with the image display on the liquid crystal display panel 22. Furthermore, the image information and the audio information are outputted to an infrared interface 55 if needed, are outputted outside through an infrared communications unit 25 by means of the infrared interface 55, and are transmitted to devices provided with a similar infrared communications unit, for example, a mobile phone, a personal computer, PDA, and so forth, which are external information devices. It should be noted that, when the moving image or the still image is displayed on the liquid crystal display panel 22 based on the image information stored in RAM 52 or the memory card 40, the image data after decoding and decompressing a file stored in RAM 52 or the memory card 40 are sent to the display control unit 54 through the bus 53 in the camera control unit 60.

A communication control unit 80 transmits/receives the electric wave to/from the base station through the antenna 21, processes the received audio information, and then outputs it to the loudspeaker 23 through the audio codec 70 in a voice call mode. Further, through the audio codec 70, it receives a sound collected by the microphone 32 and performs a predetermined process, and transmits it.

Since a depth of the image capture lens 1 (or image capture lens 2) can be made short, it can be easily installed also in a device which has restrictions in thickness like the mobile phone 10, and is suitable for the image capture lens of the mobile phone which is a portable information device.

It should be noted that although the embodiments as described above illustrate examples in which the image capture apparatus of the present invention is applied to the mobile phone, the image capture apparatus of the present invention may also naturally be applied to other information devices, for example, a personal computer, PDA, etc. and has a considerable advantage when it is applied to these information devices.

It should be understood by those skilled in the art that various modifications, combinations, sub-combinations and alterations may occur depending on design requirements and other factors insofar as they are within the scope of the appended claims or the equivalents thereof.

The present application contains subject matter related to Japanese Patent Applications No. JP2006-281044 filed in the Japanese Patent Office on Oct. 16, 2006, the entire content of which being incorporated herein by reference.

What is claimed is:

1. An image capture lens, comprising:

in order and from a side of an object, a first positive lens having a convex surface facing the object, an aperture diaphragm, a second negative lens having a convex surface facing an image, a third positive lens having a concave surface facing the image, and an IR cut filter, wherein the three lenses, aperture diaphragm, and IR cut filter are formed of resin materials, all the lens surfaces except for the IR cut filter are aspheric, and Conditional Equations (A0) to (A2)

$$0.3 < f/f1 < 1.5 \quad (A0)$$

$$-9 < f/|f2| \times 100 < -0.9 \quad (A1)$$

$$0.3 < D2/D3 < 0.5, \quad (A2)$$

where f: focal distance of the whole system, f1: focal distance of the first lens, f2: focal distance of the second lens, D2: distance from the first lens to aperture diaphragm, and D3: distance from aperture diaphragm to the second lens are satisfied.

2. The image capture lens according to claim 1, wherein Conditional Equations (A3) and (A4)

$$f/D8 < 35 \quad (A3)$$

$$Nd4 > 1.6 \quad (A4)$$

where

D8: thickness of the IR cut filter,

Nd4: refractive index at d-line of the IR cut filter. are satisfied.

3. The image capture lens according to claim 1, wherein Conditional Equation (A5)

$$0.05 < f/f3 < 0.1 \quad (A5)$$

where f3: focal distance of the third lens is satisfied.

4. An image capture apparatus having an image capture lens and an imaging device which converts an optical image formed by the image capture lens into an electric signal, the image capture lens comprising:

in order and from a side of an object, a first positive lens having a convex surface facing the object, an aperture diaphragm, a second negative lens having a convex surface facing an image, a third positive lens having a concave surface facing the image, and an IR cut filter, wherein the three lenses, aperture diaphragm and IR cut filter are formed of resin materials, all the lens surfaces except for the IR cut filter are aspheric, and Conditional Equations (A0) to (A2)

$$0.3 < f/f1 < 1.5 \quad (A0)$$

$$-9 < f/|f2| \times 100 < -0.9 \quad (A1)$$

$$0.3 < D2/D3 < 0.5, \quad (A2)$$

where f: focal distance of the whole system, f1: focal distance of the first lens, f2: focal distance of the second lens, D2: distance from the first lens to aperture diaphragm, and D3: distance from aperture diaphragm to the second lens are satisfied.

* * * * *